UNITED STATES PATENT OFFICE 2,480,498

COATED ALUMINUM WELDING RODS

Mike A. Miller and Warren E. Haupin, New Kensington, Pa., assignors to Aluminum Company of America, Pittsburgh, Pa., a corporation of Pennsylvania No Drawing. Application May 17, 1947, Serial No. 748,852

9 Claims. (Cl. 219—8)

This invention relates to coated aluminum welding rods for the welding of aluminum. It is particularly concerned with aluminum rods having improved, substantially moisture-free flux coatings, and to their use as electrodes in the metallic arc welding of aluminum. As used herein the word "aluminum" includes that metal in its various grades of purity and also aluminum base alloys.

Metallic arc welding of aluminum has been practiced for a number of years with aluminum rods having coatings produced by extrusion or dipping methods, employing a water containing mixture, suspension or slurry of welding flux. The process has met with limitations, however, when moisture remains in, or is picked up by, the flux coatings. The moisture reacts in the welding process and, consequently, causes the weld metal to be porous.

On the other hand, when the commonly known flux coated aluminum welding rods are free of moisture, they do not function well in the welding process. The elimination of moisture from the flux coating results in a decrease in the "arc force" characteristic of the rod during welding, the molten rod metal tending to accumulate on the rod and be deposited on the work in large drops or globules, with short circuiting and violent disruption of the arc. The term "arc force" is used to describe a characteristic of the arc which, within limits, aids in effecting relatively smooth transfer of metal from the rod to the work.

One method of avoiding contamination of flux coatings with moisture has been to provide rods with fused coatings produced from the commonly known fluxes; and this method of preparing rods is desirable, even though the rods so prepared lack the desired arc force. Fused flux coatings may be made of non-hygroscopic flux materials, and may be prepared and stored so as to contain insufficient moisture to produce porous welds. U. S. Patent No. 2,337,714, for instance, discloses a fused flux coated aluminum welding rod. The flux composition recommended is satisfactory for the purpose of fluxing the aluminum, and picks up little moisture; but dry rods coated in the recommended manner lack the desired arc force. Moisture is of course minimized by dip coating the rod in fused flux. Nevertheless, even fused flux coatings may take up moisture on storage, so that care should be taken to prevent absorption of moisture by, or to remove absorbed moisture from, such rods. More important, however, it is not recognized that moisture in the flux coating, or some substitute therefor, will facilitate the maintenance of the desired arc characteristics.

It may also be noted that coated rods having dual or multiple flux coatings are described in U. S. Patent No. 2,112,578, with the suggestion that the coatings be arranged with a desirable, but hygroscopic flux layer next to the rod, and with a non-hygroscopic layer on the outside. However, the coatings recommended are prepared from solutions or suspensions, from which moisture is not easily eliminated. Specifically, it is not recognized that it is desirable to produce the flux coatings from fused flux baths and to avoid altogether contamination of the flux coatings with moisture.

It is postulated that some vapor-producing agent is desirable in the rod coating to produce the desired arc characteristics, particularly the desired arc force which aids in effecting relatively smooth transfer of metal from the rod to the work. Since moisture in the rod coating induces porosity in the weld, it is an object of the invention to provide some other vapor-producing agent in the rod coating that will produce the desired arc characteristics, without inducing porosity in the weld.

In addition it is an object to produce a rod coating that is adherent to the rod, and yet has sufficient flexibility so that it will not readily flake, crack or chip off. A still further object is to provide a rod coating that will serve its primary fluxing function without producing an unduly tenacious slag on the work. Achievement of these objects may require some compromise, since modifications of rod coatings to improve adherence of a flux to the rod usually increases the tenaciousness of the slag produced and modifications to reduce slag tenacity usually also reduce flux adherence. The invention also has for an object the efficient utilization of the flux and vapor-producing agent.

Generally stated the invention comprises an improved aluminum welding rod having a zinc-containing coating and a moisture-free flux coating thereover. It has been discovered that metallic zinc may be incorporated in a coated rod to increase the arc force, in the absence of moisture, but that zinc does not induce porosity in the weld, as does moisture.

It is possible to incorporate zinc in a welding rod as an alloying constituent of the aluminum rod, and thereby to obtain some of the benefits of the invention. Large amounts of such an alloying constituent would be required, however, (several per cent of the entire metal content of the aluminum rod). Consequently, that practice is inefficient and it is undesirable, since appreciable amounts of zinc would be deposited in the weld and its presence therein is usually objectionable.

The zinc may best be incorporated in a coated rod by way of a zinc-containing coating on the rod. The zinc, whether in pure metallic form or as an alloy, may be provided as an integral coating on the aluminum rod; and may be produced by methods used to produce duplex metals, by such methods as spraying, dipping, electroplating or galvanizing, or preferably by dip coating a heated rod in a fused zinc-containing flux. In connection with the latter preferred method, it is to be noted that fluxes containing zinc salts tend to be hygroscopic, so that the removal of excess zinc-containing flux, and the provision of a substantially moisture-free, non-hygroscopic, fused flux coating over the zinc-containing coating is especially to be desired. Dipping the zinc coated rod in a dehydrated fused flux bath avoids original contamination of the flux coating with moisture. Furthermore, fused flux coatings may be applied, as hereinafter indicated, so as to resist absorption of moisture, to have good adherence to the rod, and to have a minimum tendency to form tenacious slags. A zinc-containing coating next to the rod, produced from a zinc-containing flux, has the added advantage of promoting adherence of the final flux coating; and the final flux coating tends to protect the zinc-containing flux from picking up moisture.

It is to be further noted that the provision of a zinc coating on the rod is efficient in the respect to the ultimate utilization of the zinc in supplying substantially moisture-free vapor to the arc, since the zinc is thereby supplied from around the rod metal and from within the flux coating; and that provision of the zinc in a coating layer results in a minimum amount of zinc being deposited in the weld.

Specific examples of coated aluminum welding rods of the invention, made in accordance with the preferred procedures, will now be described:

Example I

Aluminum welding rods of extruded 356 alloy and of drawn 43S alloy welding wire, 1/8" in diameter, were preheated to a temperature of about 1020° F. Then the rods were first dipped in a fused flux bath of the following composition:

| Flux Salts | Per Cent by Weight |
|---|---|
| Sodium Chloride | 28 |
| Potassium Chloride | 33 |
| Strontium Chloride | 34 |
| Zinc Chloride | 5 | held at a temperature of about 1150° F. The dipping step required about two seconds. Although not necessary, it was found convenient and desirable to scrape off excess flux when the rods were removed from the fused flux bath, so as to leave mainly a zinc alloy coating on the rods, with a minimum of hygroscopic flux ingredients. It may be noted that the strontium chloride content of this flux is not essential, but appears to improve the metal transfer and arc characteristics of the finally coated rod.

Thereafter the zinc coated rods were dipped in a fused flux bath of the following composition:

| Flux Salts | Per Cent by Weight |
|---|---|
| Sodium Chloride | 30 |
| Potassium Chloride | 30 |
| Lithium Fluoride | 15 |
| Sodium Aluminum Fluoride | 25 | which flux will be recognized as that described in U. S. Patent No. 2,337,714. This flux was likewise held at a temperature of about 1150° F. The dipping step required about two seconds, but in this case was repeated three times in order to build up a flux coating of preferred thickness.

Example II

Aluminum welding rod of 2S grade and 43S alloy welding wire, 1/8", 3/32" and 1/16" in diameter, were preheated to 800° F. and first dipped in a fused flux bath of the following composition:

| Flux Salts | Per Cent by Weight |
|---|---|
| Sodium Chloride | 26 |
| Potassium Chloride | 54 |
| Lithium Fluoride | 8 |
| Zinc Chloride | 12 | held at a temperature of about 1200° F. Thereafter the zinc coated rods were dipped in a fused flux bath of the same composition as that used for the second coating in Example I, the flux bath again being held at a temperature of about 1150° F.

Example III

Rods were first dipped in a fused flux bath of the same composition as that first employed in Example II, and thereafter dipped in a fused flux bath of the following composition:

| Flux Salts | Per Cent by Weight |
|---|---|
| Sodium Chloride | 29 |
| Potassium Chloride | 45 |
| Lithium Fluoride | 7 |
| Sodium Aluminum Fluoride | 19 |

Example IV

Rods were first dipped in a fused flux bath of the following composition:

| Flux Salts | Per Cent by Weight |
|---|---|
| Sodium Chloride | 40 |
| Potassium Chloride | 52 |
| Lithium Fluoride | 5 |
| Zinc Fluoride | 3 | and thereafter dipped in a fused flux bath of the following composition:

| Flux Salts | Per Cent by Weight |
| --- | --- |
| Sodium Chloride | 29 |
| Potassium Chloride | 44.5 |
| Lithium Fluoride | 5.75 |
| Calcium Chloride | 1.75 |
| Sodium Aluminum Fluoride | 19 |

It was later found desirable, however, to omit the calcium chloride since it is somewhat hygroscopic.

*Example V*

Rods were first dipped in a fused flux bath of the following composition:

| Flux Salts | Per Cent by Weight |
| --- | --- |
| Sodium Chloride | 38 |
| Potassium Chloride | 30 |
| Strontium Chloride | 30 |
| Zinc Fluoride | 2 | and thereafter dipped in a fused flux bath of the following composition:

| Flux Salts | Per Cent by Weight |
| --- | --- |
| Sodium Chloride | 46.5 |
| Potassium Chloride | 46.5 |
| Lithium Fluoride | 7 |

This concludes the specific examples.

While it has been previously pointed out herein that a zinc-containing coating may be provided on the aluminum rod by other methods, the fused flux dipping method of the examples appears to be the most satisfactory and convenient for general use. The zinc-containing fused flux bath composition may vary widely, but flux compositions such as are disclosed in U. S. Patent No. 2,299,164 are very suitable. The zinc content of the flux is preferably maintained above about 1 per cent by weight of the entire bath, and preferably not more than about 8 per cent. The zinc is present in the flux bath as a halide salt such as zinc fluoride in amounts between about 1.5 and 12 per cent by weight (preferably 2 to 7 per cent), zinc chloride in amounts between about 2 and 16 per cent (preferably 5 to 12 per cent), or zinc bromide in amounts between about 3 and 27 per cent (preferably 8 to 14 per cent). The zinc halide partially reacts with the aluminum of the rod when the rod is dipped in the fused flux bath, to form a zinc alloy and fused flux coating on the rod. Likewise it is believed that additional amounts of the zinc halide in the flux react in the arc to provide a further source of metallic zinc.

Further the zinc-containing fused flux bath may contain a strontium halide, as much as about 30 to 40 per cent of strontium chloride, for example, but such an addition is not at all essential and may be omitted entirely.

Likewise the zinc-containing flux bath may contain an alkali or alkaline earth fluoride, about 1 to 15 per cent (preferably 2 to 8 per cent) of lithium fluoride, for example, but sodium or potassium fluoride may be present. Of the alkaline earth fluorides, strontium fluoride is satisfactory, limited amounts of calcium fluoride may be employed, but barium fluoride produces poisonous fumes. A fluoride addition is not at all essential and may be omitted entirely.

The balance, usually the major part, of the zinc-containing flux bath may conveniently be a vehicle of two or more inorganic flux salts such as the alkali and alkaline earth chlorides. Of the alkali chlorides, sodium chloride in amounts by weight between about 5 and 60 per cent, and potassium chloride in amounts between about 5 and 60 per cent are preferred. Lithium chloride is not desirable because it is hygroscopic; but, since the essential zinc salts are also hygroscopic, lithium chloride may be employed in small amounts. Of the alkaline earth chlorides, only strontium chloride (as mentioned above) is preferred. Calcium chloride is hygroscopic, and barium chloride produces poisonous fumes.

To prepare it for the first dipping operation, the aluminum rod is best preheated to a temperature of about 1020° F., although lower temperatures are sometimes found satisfactory. When preheated, the rod should be promptly dipped for a few seconds in the first fused flux bath, which is best held at a temperature of about 1100 to 1200° F., depending upon the melting point of the flux. Much of the flux may be scraped off upon removal of the rod from this bath, if desired.

The second coating may be provided by similar methods. The flux bath composition for this coating likewise may vary widely and many previously known flux compositions are suitable. The commonly known fluxes usually, but not always, include about 10 to 25 per cent by weight of sodium aluminum fluoride, and about 5 to 20 per cent by weight of lithium fluoride.

At least the main body of the second flux bath may conveniently be made up of two or more non-hygroscopic inorganic flux salts such as sodium chloride and potassium chloride. Strontium chloride may be added, but neither any other of the alkaline earth chlorides nor lithium chloride is suitable, however. Any one of the suitable chlorides may be present in amounts by weight up to about 5 to 60 per cent. Preferably both sodium chloride and potassium chloride are employed as a vehicle for the other flux salts.

The aluminum rod having a zinc-containing coating is best preheated (if it has not previously been preheated and kept hot) to a temperature of about 1020° F. and then promptly dipped for a few seconds in the second fused flux bath, which is best held at a temperature of about 1100 to 1200° F., depending upon the melting point of the flux. The rod may be cooled slightly and redipped a number of times to built up thicker coatings.

From the foregoing discussion it will be seen that many variations may be made to suit specific conditions, but that the invention involves preferably the coating of an aluminum rod with zinc from a zinc-containing flux, and then finally coating the same with a substantially moisture-free flux, preferably a non-hygroscopic fused flux.

The welding rod proper is of course made of aluminum. It will usually be an aluminum alloy selected for its welding characteristics. When the rod is to be preheated for coating, an air hardening alloy may be desirable so that the rod, after coating, will have appreciable strength against bending. Alloys such as 356 alloy have been found suitable in this respect, but other alloys, as indicated in the examples, are often used.

The coating on the rod, when produced by the fused flux dipping method, comprises metallic zinc alloyed with the aluminum, additional zinc in the form of halide salt from the zinc-containing flux layer, and other inorganic flux salts. The total amount of either metallic zinc or zinc in the halide salt is small (much less than one per cent of the aluminum weight), as is shown by analyses of weld beads made with the rods. Rods of the type described in Example II, for instance, produced weld beads containing less than 0.1 per cent zinc. On the other hand, aluminum alloy rods containing only one per cent zinc (coated with fluxes not containing zinc) produced welds containing about 0.5 per cent zinc, without providing the desired arc characteristics.

What is claimed is:

1. An improved aluminum welding rod having a zinc coating and an aluminum welding flux coating thereover.

2. An improved aluminum welding rod having a zinc coating and a substantially moisture-free fused aluminum welding flux coating thereover.

3. An improved aluminum welding rod having a zinc coating and an aluminum welding flux coating thereover comprised essentially of inorganic flux salts, including sodium and potassium chlorides as the vehicle.

4. An improved aluminum welding rod having a zinc-containing fused coating and a substantially moisture-free fused aluminum welding flux coating thereover, said first mentioned coating being comprised essentially of at least two alkali chlorides, at least one zinc halide, and metallic zinc from the reaction of the zinc halide with the aluminum rod during coating thereof.

5. An improved aluminum welding rod having a zinc-containing fused coating and a substantially moisture-free fused aluminum welding flux coating thereover, said first mentioned coating being comprised essentially of at least two alkali chlorides, at least one alkali fluoride, at least one zinc halide, and metallic zinc from the reaction of the zinc halide with the aluminum rod during coating thereof.

6. An improved aluminum welding rod having a zinc-containing fused coating and a substantially moisture-free fused aluminum welding flux coating thereover, said first mentioned coating being comprised essentially of at least two alkali chlorides and at least one zinc halide, at least one strontium halide, and metallic zinc from the reaction of the zinc halide with the aluminum rod during coating thereof.

7. An improved aluminum welding rod having a zinc coating and an aluminum welding fused flux coating thereover, said second-mentioned coating comprising essentially sodium and potassium chlorides, lithium fluoride, and sodium aluminum fluoride.

8. An improved aluminum welding rod having a zinc coating and an aluminum welding flux coating thereover, said second mentioned coating comprising about 5 to 60 per cent by weight sodium chloride, about 5 to 60 per cent potassium chloride, about 5 to 20 per cent lithium fluoride, and up to about 10 to 25 per cent sodium aluminum fluoride.

9. An improved aluminum welding rod having a zinc-containing fused coating and a substantially moisture-free flux coating thereover, said first-mentioned coating comprising about 5 to 60% sodium chloride, about 5 to 60 per cent potassium chloride, up to about 40 per cent strontium chloride, and about 1 to 8 per cent zinc in the form of at least one halide and metallic zinc from the reaction of the halide with the aluminum rod during coating thereof, and said second-mentioned coating comprising about 5 to 60 per cent by weight sodium chloride, about 5 to 60 per cent potassium chloride, about 5 to 20 per cent lithium fluoride, and up to about 10 to 25 per cent sodium aluminum fluoride.

MIKE A. MILLER.
WARREN E. HAUPIN.

REFERENCES CITED

The following references are of record in the file of this patent:

UNITED STATES PATENTS

| Number | Name | Date |
|---|---|---|
| 1,814,878 | Weed | July 14, 1931 |
| 2,001,848 | Nyquist | May 21, 1935 |
| 2,054,054 | Jarman | Sept. 8, 1936 |
| 2,112,578 | Rohrig | Mar. 29, 1938 |
| 2,170,019 | Gaylord | Aug. 22, 1939 |
| 2,337,714 | Haim et al. | Dec. 28, 1943 |